United States Patent
Nishide et al.

(10) Patent No.: US 9,577,247 B2
(45) Date of Patent: Feb. 21, 2017

(54) POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

(75) Inventors: Daisuke Nishide, Hyogo (JP); Fumiharu Niina, Hyogo (JP); Hiroshi Kawada, Osaka (JP); Toshikazu Yoshida, Hyogo (JP); Yoshinori Kida, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 98 days.

(21) Appl. No.: 14/343,825

(22) PCT Filed: Aug. 30, 2012

(86) PCT No.: PCT/JP2012/072024
§ 371 (c)(1),
(2), (4) Date: Mar. 7, 2014

(87) PCT Pub. No.: WO2013/038918
PCT Pub. Date: Mar. 21, 2013

(65) Prior Publication Data
US 2014/0227599 A1    Aug. 14, 2014

(30) Foreign Application Priority Data

Sep. 12, 2011  (JP) ................. 2011-197920
Feb. 29, 2012  (JP) ................. 2012-042653

(51) Int. Cl.
*H01M 4/36*     (2006.01)
*H01M 4/505*    (2010.01)
(Continued)

(52) U.S. Cl.
CPC ............ *H01M 4/364* (2013.01); *H01M 4/131* (2013.01); *H01M 4/505* (2013.01); *H01M 4/525* (2013.01); *Y02E 60/122* (2013.01)

(58) Field of Classification Search
None
See application file for complete search history.

(56) References Cited

U.S. PATENT DOCUMENTS

2004/0058244 A1    3/2004  Hosoya et al.
2004/0076882 A1    4/2004  Hosoya et al.
(Continued)

FOREIGN PATENT DOCUMENTS

JP    09-035715 A    2/1997
JP    11-162466 A    6/1999
(Continued)

OTHER PUBLICATIONS

International Search Report dated Nov. 27, 2012, issued in corresponding application No. PCT/JP2012/072024.

*Primary Examiner* — Miriam Stagg
*Assistant Examiner* — Wojciech Haske
(74) *Attorney, Agent, or Firm* — Westerman, Hattori, Daniels & Adrian, LLP

(57) ABSTRACT

A positive electrode active material capable of improving an output performance of a nonaqueous electrolyte secondary battery is provided. A positive electrode active material of a nonaqueous electrolyte secondary battery 1 contains a first positive electrode active material and a second positive electrode active material. In the first positive electrode active material, the content of cobalt is 15% or more on an atomic percent basis in transition metals. In the second positive electrode active material, the content of cobalt is 5% or less on an atomic percent basis in transition metals. An average secondary particle diameter r1 of the first positive electrode active material is smaller than an average secondary particle diameter r2 of the second positive electrode active material.

12 Claims, 3 Drawing Sheets

(51) Int. Cl.
   *H01M 4/525*   (2010.01)
   *H01M 4/131*   (2010.01)

(56) References Cited

U.S. PATENT DOCUMENTS

| | | | |
|---|---|---|---|
| 2007/0099087 A1* | 5/2007 | Mihara | C01B 25/45 |
| | | | 429/231.95 |
| 2008/0090151 A1 | 4/2008 | Hosoya et al. | |
| 2009/0029254 A1 | 1/2009 | Hosoya et al. | |
| 2010/0081055 A1 | 4/2010 | Konishi et al. | |
| 2010/0099027 A1 | 4/2010 | Kikuya et al. | |
| 2010/0310934 A1 | 12/2010 | Yang et al. | |

FOREIGN PATENT DOCUMENTS

| | | |
|---|---|---|
| JP | 2003-173776 A | 6/2003 |
| JP | 2003-203631 A | 7/2003 |
| JP | 2007-317585 A | 12/2007 |
| JP | 2008-251532 A | 10/2008 |
| JP | 2010-86693 A | 4/2010 |
| JP | 2010-282967 A | 12/2010 |
| WO | 2009/031619 A1 | 3/2009 |

\* cited by examiner

POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

TECHNICAL FIELD

The present invention relates to a positive electrode active material of a nonaqueous electrolyte secondary battery and to a nonaqueous electrolyte secondary battery.

BACKGROUND ART

As a positive electrode active material of a nonaqueous electrolyte secondary battery, a lithium composite oxide has been widely used. For example, Patent Document 1 has disclosed a secondary battery in which a lithium composite oxide containing cobalt is used as a positive electrode active material.

CITATION LIST

Patent Document

PTD 1: Japanese Published Unexamined Patent Application No. 2010-86693

SUMMARY OF INVENTION

Technical Problem

In recent years, in concomitant with an increase in price of cobalt, development of a positive electrode active material containing a small amount of cobalt has been desired. However, in a nonaqueous electrolyte secondary battery using a positive electrode active material containing a small amount of cobalt, there has been a problem in that a sufficient output performance is not obtained.

A primary object of the present invention is to provide a positive electrode active material which is able to improve an output performance of a nonaqueous electrolyte secondary battery.

Solution to Problem

A positive electrode active material of a nonaqueous electrolyte secondary battery of the present invention includes a first positive electrode active material and a second positive electrode active material. In the first positive electrode active material, the content of cobalt is 15% or more on an atomic percent basis in transition metals. In the second positive electrode active material, the content of cobalt is 5% or less on an atomic percent basis in transition metals. An average secondary particle diameter r1 of the first positive electrode active material is smaller than an average secondary particle diameter r2 of the second positive electrode active material.

A nonaqueous electrolyte secondary battery of the present invention includes a positive electrode containing the above positive electrode active material, a negative electrode, a nonaqueous electrolyte, and a separator.

Advantageous Effects of Invention

According to the present invention, a positive electrode active material which is able to improve an output performance of a nonaqueous electrolyte secondary battery can be provided.

DESCRIPTION OF EMBODIMENTS

Figure 1:
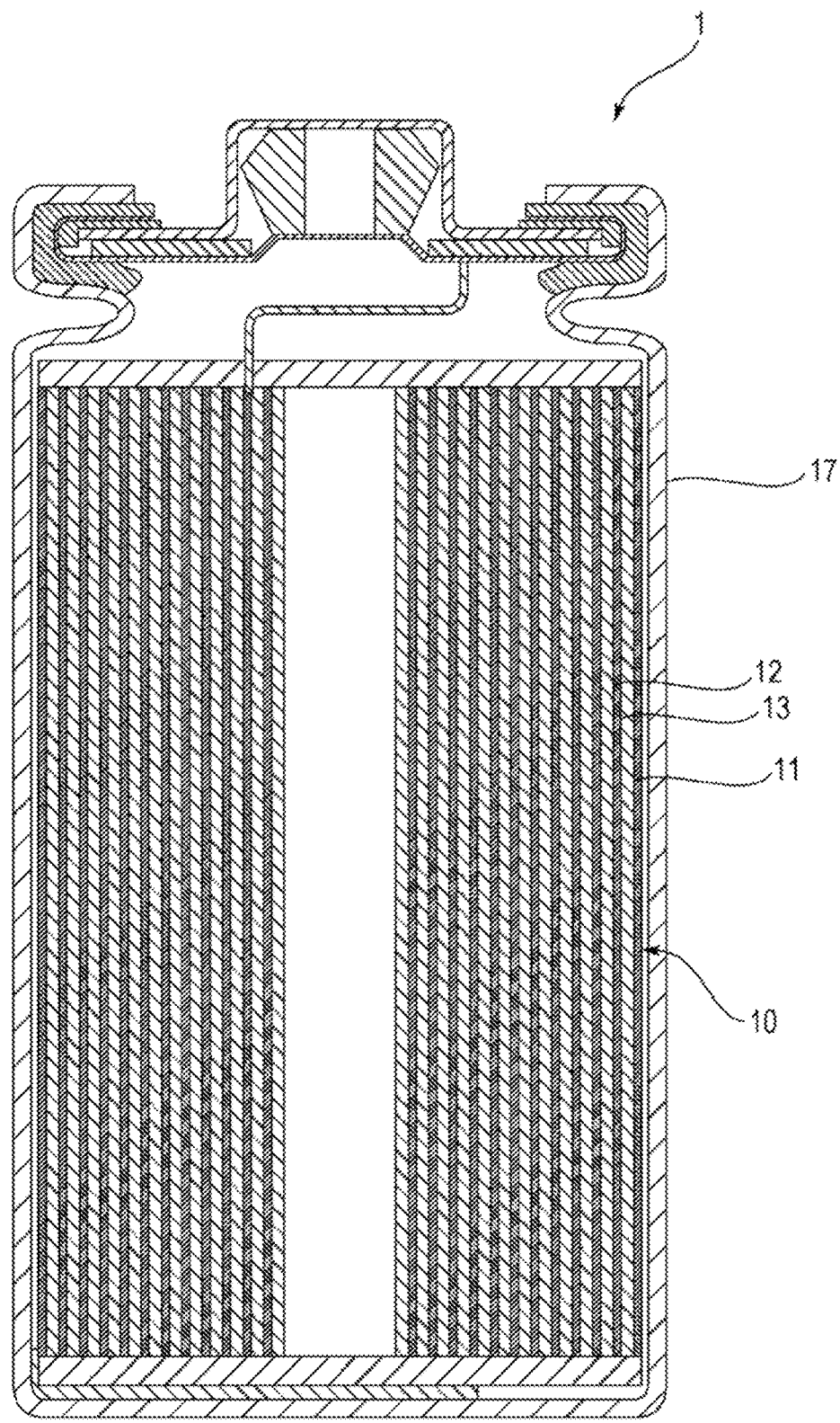
FIG. 1 is a schematic cross-sectional view of a nonaqueous electrolyte secondary battery according to one embodiment of the present invention.

Hereinafter, one example of preferable embodiments of the present invention will be described. However, the following embodiments are simply shown by way of example. The present invention is not limited to the following embodiments.

In addition, the drawings referred in the embodiments are schematically drawn, and for example, the ratio in dimension of a constituent shown in the drawing may be different, for example, from the ratio in dimension of an actual constituent. The dimensional ratio and the like of a concrete constituent may be appropriately judged in consideration of the following description.

As shown in FIG. 1, a nonaqueous electrolyte secondary battery 1 includes a battery container 17. In this embodiment, the battery container 17 is a cylindrical container. However, in the present invention, the shape of the battery container is not limited to a cylindrical shape. The shape of the battery container may be a flat shape or the like.

In the battery container 17, an electrode body 10 impregnated with a nonaqueous electrolyte is received.

As the nonaqueous electrolyte, for example, a known nonaqueous electrolyte may be used. The nonaqueous electrolyte contains a solute, a nonaqueous solvent, and the like.

As the solute of the nonaqueous electrolyte, for example, a known lithium salt may be used. As a lithium salt preferably used as the solute of the nonaqueous electrolyte, for example, a lithium salt containing at least one element selected from the group consisting of P, B, F, O, S, N, and Cl may be mentioned. As particular examples of the lithium salt as described above, for example, there may be mentioned $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, and $LiClO_4$. Among those mentioned above, in order to improve a high-rate charge-discharge performance and durability, $LiPF_6$ is more preferably used as the solute of the nonaqueous electrolyte. The nonaqueous electrolyte may contain either one type of solute or plural types of solutes.

In addition, as the solute of the nonaqueous electrolyte, a lithium salt containing an oxalate complex as an anion may also be used. As the lithium salt containing an oxalate complex as an anion, besides LiBOB (lithium bisoxalate borate), for example, there may be mentioned a lithium salt containing an anion in which $C_2O_4^{-2}$ is coordinated to a central atom, such as $Li[M(C_2O_4)_xR_y]$ (in the formula, M represents an element selected from a transition metal and one of a group IIIb, a group IVb, and a group Vb element of the period table; R represents a group selected from a halogen, an alkyl group, and a halogenated alkyl group; x is a positive integer; and y is 0 or a positive integer). In particular, for example, $Li[B(C_2O_4)F_2]$, $Li[P(C_2O_4)F_4]$, and $Li[P(C_2O_4)_2F_2]$ may be mentioned. However, in order to form a stable film on a surface of the negative electrode even under a high-temperature environment, among the lithium salts each containing an oxalate complex as an anion, LiBOB is most preferably used.

As the nonaqueous solvent of the nonaqueous electrolyte, for example, there may be mentioned a cyclic carbonate, a chain carbonate, and a mixed solvent of a cyclic carbonate and a chain carbonate. As particular examples of the cyclic carbonate, for example, there may be mentioned ethylene carbonate, propylene carbonate, butylene carbonate, and vinylene carbonate. As particular examples of the chain carbonate, for example, there may be mentioned dimethyl carbonate, methyl ethyl carbonate, and diethyl carbonate. Among those mentioned above, as a nonaqueous solvent having a low viscosity, a low melting point, and a high lithium ion conductivity, a mixed solvent of a cyclic carbonate and a chain carbonate is preferably used. In the mixed solvent of a cyclic carbonate and a chain carbonate, a mixing ratio (cyclic carbonate:chain carbonate) between a cyclic carbonate and a chain carbonate is preferably in a range of 2:8 to 5:5 on a volume basis.

The nonaqueous solvent may also be a mixed solvent of a cyclic carbonate and an ether solvent, such as 1,2-dimethoxy ethane or 1,2-diethoxy ethane.

In addition, as the nonaqueous solvent of the nonaqueous electrolyte, an ionic liquid may also be used. A cationic species and an anionic species of the ionic liquid are not particularly limited. In consideration of a low viscosity, an electrochemical stability, and a hydrophobic characteristic, as the cation, for example, a pyridium cation, an imidazolium cation, or a quaternary ammonium cation is preferably used. An ionic liquid containing, for example, a fluorine-containing imide-based anion as the anion is preferably used.

In addition, as the nonaqueous electrolyte, a gelled polymer electrolyte containing a polymer electrolyte, such as a polyethylene oxide) or a poly(acrylonitrile), impregnated with an electrolyte solution or an inorganic solid electrolyte, such as LiI or $Li_3N$, may also be used.

The electrode body 10 is formed by winding a negative electrode 11, a positive electrode 12, and a separator 13 provided therebetween.

As long as a short circuit caused by the contact between the negative electrode 11 and the positive electrode 12 can be suppressed, and a lithium ionic conductivity can be obtained when the separator 13 is impregnated with a nonaqueous electrolyte, the separator 13 is not particularly limited. The separator 13 may be formed, for example, of a resin-made porous film. As a particular example of the resin-made porous film, for example, a polypropylene-made or a polyethylene-made porous film, or a laminate of a polypropylene-made porous film and a polyethylene-made porous film may be mentioned.

The negative electrode 11 includes a negative electrode collector and a negative electrode active material layer provided on at least one surface of the negative electrode collector. The negative electrode collector may be formed, for example, from a metal, such as copper, or an alloy containing a metal, such as copper.

The negative electrode active material is not particularly limited as long as being capable of reversibly occluding and releasing lithium ions. As the negative electrode active material, for example, a carbon material, a material forming an alloy with lithium, and a metal oxide, such as tin oxide, may be mentioned. As the material forming an alloy with lithium, for example, there may be mentioned at least one type of metal selected from the group consisting of silicon, germanium, tin, and aluminum or an alloy containing at least one type of metal selected from the group consisting of silicon, germanium, tin and aluminum. As particular examples of the carbon material, for example, there may be mentioned natural graphite, artificial graphite, mesophase pitch-based carbon fibers (MCF), mesocarbon microbeads (MCMB), cokes, hard carbon, fullerene, and carbon nanotubes. In order to improve the high-rate charge-discharge performance, a carbon material formed by covering a graphite material with low-crystalline carbon is preferably used as the negative electrode active material.

In the negative electrode active material layer, for example, a known carbon conductive agent, such as graphite, and a known adhesive, such as a sodium carboxy methyl cellulose (CMC) or a styrene butadiene rubber (SB), may be contained.

The positive electrode 12 includes a positive electrode collector and a positive electrode active material layer. The positive electrode collector is preferably formed from aluminum or an aluminum alloy. In particular, the positive electrode collector is preferably formed of aluminum foil or alloy foil containing aluminum.

The positive electrode active material layer is provided on at least one surface of the positive electrode collector. The surface of the positive electrode collector is covered with the positive electrode active material layer.

The positive electrode active material layer contains a positive electrode active material. Besides the positive electrode active material, the positive electrode active material layer may also contain proper materials, such as a binder agent and a conductive agent. As a particular example of a preferably used binder agent, for example, a poly(vinylidene fluoride) may be mentioned. As particular examples of a preferably used conductive agent, for example, carbon materials, such as graphite, carbon black, and acetylene black, may be mentioned.

The positive electrode active material contains a first positive electrode active material and a second positive electrode active material.

The content of cobalt in the first positive electrode active material is 15% or more on an atomic percent basis in transition metals. In the first positive electrode active material, the content of cobalt is preferably 15% to 40% on an atomic percent basis in the transition metals and more preferably 17% to 35%. The first positive electrode active material preferably has a layered structure.

The first positive electrode active material is preferably a compound represented by the following general formula (1):

$$Li_{1+x1}Ni_{a1}Mn_{b1}Co_{c1}O_{2+d1} \quad (1)$$

[In the formula, x1, a1, b1, c1, and d1 satisfy $x1+a1+b1+c1=1$, $0<x1\le0.1$, $0.15\le c1/(a1+b1+c1)$, $0.7\le a1/b1\le3.0$, and $-0.1\le d1\le0.1$.]

When the first positive electrode active material is the compound represented by the general formula (1), if $0.15\le c1/(a1+b1+c1)$ is satisfied, degradation in output performance caused by a decrease in cobalt content in the positive electrode active material can be suppressed.

The content of cobalt in the second positive electrode active material is 5% or less on an atomic percent basis in transition metals. The second positive electrode active material preferably has a layered structure. The second positive electrode active material may contain substantially no cobalt.

The second positive electrode active material is preferably a compound represented by the following general formula (2):

$$Li_{1+x2}Ni_{a2}Mn_{b2}Co_{c2}O_{2+d2} \quad (2)$$

[In the formula, x2, a2, b2, c2, and d2 satisfy $x2+a2+b2+c2=1$, $0<x2\leq0.1$, $0\leq c2/(a2+b2+c2)\leq0.05$, $0.7\leq a2/b2\leq3.0$, and $-0.1\leq d2\leq0.1$.]

When the second positive electrode active material is the compound represented by the general formula (2), if $0\leq c2/(a2+b2+c2)\leq0.05$ is satisfied, degradation in output performance can be suppressed while the content of cobalt in the positive electrode active material is suppressed.

When the first and the second positive electrode active materials are the compounds represented by the general formulas (1) and (2), respectively, and when $0.7\leq a1/b1\leq3.0$ and $0.7\leq a2/b2\leq3.0$ are respectively satisfied, extreme degradation in heat stability of the positive electrode active material and a decrease in temperature at which heat generation is peaked can be suppressed, and hence the safety can be enhanced. In addition, since a1/b1 and a2/b2 are set in the ranges described above, the ratio of Mn in the positive electrode active material is not excessively increased, and a decrease in capacity caused by the generation of an impurity layer can be suppressed. From the points as described above, in the general formulas (1) and (2), $1.0\leq a1/b1\leq2.0$ and $1.0\leq a2/b2\leq2.0$ are more preferably satisfied, respectively.

In addition, when the first and the second positive electrode active materials are the compounds represented by the general formulas (1) and (2), respectively, and when $0<x1\leq0.1$ and $0<x2\leq0.1$ are respectively satisfied, an increase in amount of an alkaline remaining on the surface of the first positive electrode active material can be suppressed. Hence, in a step of manufacturing the positive electrode active material, a slurry is suppressed from being gelled, and at the same time, a decrease in capacity caused by a decrease in amount of transition metals which perform an oxidation-reduction reaction can also be suppressed. Hence, the output performance of the nonaqueous electrolyte secondary battery 1 can be improved. In the general formulas (1) and (2), the conditions of $0.05\leq x1\leq0.1$ and $0.05\leq x2\leq0.1$ are preferably satisfied, and the conditions of $0.07\leq x1\leq0.1$ and $0.07\leq x2\leq0.1$ are more preferably satisfied.

Furthermore, when the first and the second positive electrode active materials are the compounds represented by the general formulas (1) and (2), respectively, and when $-0.1\leq d\leq0.1$ is satisfied in the both formulas, even if the positive electrode active material is placed in an oxygen deficient state or in an oxygen excessive state, the crystalline structure of the positive electrode active material can be suppressed from being damaged.

In each of the first and the second positive electrode active materials, at least one selected from the group consisting of boron, fluorine, magnesium, aluminum, titanium, chromium, vanadium, iron, copper, zinc, niobium, molybdenum, zirconium, tin, tungsten, sodium, and potassium may also be contained.

An average secondary particle diameter r1 of the first positive electrode active material is preferably approximately 1 to 30 μm and more preferably approximately 2 to 25 μm. In addition, an average secondary particle diameter r2 of the second positive electrode active material is preferably approximately 1 to 30 μm and more preferably approximately 2 to 25 μm. Since the average secondary particle diameters of the first and the second positive electrode active materials are in the ranges described above, degradation in discharge performance of the nonaqueous electrolyte secondary battery 1 can be suppressed. In addition, for example, degradation in storage performance caused by chemical reactions of the first and the second positive electrode active materials with the nonaqueous electrolyte can also be suppressed.

In addition, in the present invention, the average secondary particle diameter of each of the first and the second positive electrode active materials is the value of a median diameter obtained by particle distribution measurement using a laser diffraction method. In addition, the secondary particles of the first and the second positive electrode active materials are each formed by aggregation of approximately several hundreds of primary particles.

The average secondary particle diameter r1 of the first positive electrode active material is smaller than the average secondary particle diameter r2 of the second positive electrode active material. In the positive electrode active material, the first positive electrode active material is preferably adhered to the surface of the second positive electrode active material. Furthermore, many particles of the first positive electrode active material are preferably adhered to the surface of the second positive electrode active material so that the second positive electrode active material is covered with the first positive electrode active material. It is believed that since the average secondary particle diameter r1 of the first positive electrode active material is smaller than the average secondary particle diameter r2 of the second positive electrode active material, the surface of the second positive electrode active material can be entirely covered, and lithium ions are likely to be diffused, for example, to the surface of the positive electrode active material. The average secondary particle diameter r1 of the first positive electrode active material and the average secondary particle diameter r2 of the second positive electrode active material preferably satisfy the relationship of $r1/r2<0.8$.

In addition, the content of the second positive electrode active material in the positive electrode active material is preferably 10 percent by mass or more and 90 percent by mass or less. In order to decrease the content of cobalt in the positive electrode active material, the content of the second positive electrode active material in the positive electrode active material is more preferably 40 percent by mass or more. In order to improve the output performance of the nonaqueous electrolyte secondary battery 1, the content of the second positive electrode active material in the positive electrode active material is further preferably 50 percent by mass or more and particularly preferably 60 percent by mass or more.

The content of the first positive electrode active material in the positive electrode active material is preferably 10 percent by mass or more. The content of the first positive electrode active material in the positive electrode active material is preferably 90 percent by mass or less, more preferably 60 percent by mass or less, even more preferably 50 percent by mass or less, and particularly preferably 40 percent by mass or less.

The first and the second positive electrode active materials may be obtained in such a way that for example, a Li compound, a transition metal composite hydroxide, a transition metal oxide, and the like are used in combination as raw materials and are then fired at an appropriate temperature. A known mixing method may be used for mixing the first and the second positive electrode active materials, and for example, mixing may be performed to form a composite by adhering one type of particles to the other type of particles. The type of Li compound is not particularly limited, and for example, at least one selected from lithium hydroxide, lithium carbonate, lithium chloride, lithium sulfate, lithium acetate, and hydrates thereof may be used. In addition, although a firing temperature for firing the above raw materials is difficult to be simply determined since depending, for example, on the composition and the particle size of the transition metal composite hydroxide or the transition metal composite oxide used as the raw material, the firing temperature is generally in a range of approximately 500° C. to 1,100° C., preferably in a range of approximately 600° C. to 1,000° C., and more preferably in a range of approximately 700° C. to 900° C.

Incidentally, as described above, in a nonaqueous electrolyte secondary battery which uses a positive electrode active material containing a small amount of cobalt, there has been a problem in that a sufficient output performance cannot be obtained.

In order to solve this problem, the present inventors carried out the following Experiments 1 to 6 and investigated the influence of the content of cobalt in the positive electrode active material on the capacity characteristics and the output performance of the nonaqueous electrolyte secondary battery.

Experiment 1

$Li_2CO_3$ was mixed at a predetermined ratio with $Ni_{0.5}Mn_{0.5}(OH)_2$ obtained by a co-precipitation method and was then fired at 1,000° C. in the air, so that a positive electrode active material formed of $Li_{1.06}Ni_{0.47}Mn_{0.47}O_2$ having a layered structure was obtained.

Experiment 2

$Li_2CO_3$ was mixed at a predetermined ratio with $Ni_{0.49}Co_{0.03}Mn_{0.49}(OH)_2$ obtained by a co-precipitation method and was then fired at 980° C. in the air, so that a positive electrode active material formed of $Li_{1.06}Ni_{0.46}CO_{0.03}Mn_{0.46}O_2$ having a layered structure was obtained.

Experiment 3

$Li_2CO_3$ was mixed at a predetermined ratio with $Ni_{0.48}Co_{0.05}Mn_{0.48}(OH)_2$ obtained by a co-precipitation method and was then fired at 960° C. in the air, so that a positive electrode active material formed of $Li_{1.06}Ni_{0.45}CO_{0.05}Mn_{0.45}O_2$ having a layered structure was obtained.

Experiment 4

$Li_2CO_3$ was mixed at a predetermined ratio with $Ni_{0.45}Co_{0.1}Mn_{0.45}(OH)_2$ obtained by a co-precipitation method and was then fired at 940° C. in the air, so that a positive electrode active material formed of $Li_{1.06}Ni_{0.43}CO_{0.09}Mn_{0.43}O_2$ having a layered structure was obtained.

Experiment 5

$Li_2CO_3$ was mixed at a predetermined ratio with $Ni_{0.4}Co_{0.2}Mn_{0.4}(OH)_2$ obtained by a co-precipitation method and was then fired at 920° C. in the air, so that a positive electrode active material formed of $Li_{1.06}Ni_{0.38}CO_{0.19}Mn_{0.38}O_2$ having a layered structure was obtained.

Experiment 6

$Li_2CO_3$ was mixed at a predetermined ratio with $Ni_{0.35}Co_{0.3}Mn_{0.35}(OH)_2$ obtained by a co-precipitation method and was then fired at 900° C. in the air, so that a positive electrode active material formed of $Li_{1.06}Ni_{0.33}CO_{0.28}Mn_{0.33}O_2$ having a layered structure was obtained.

The positive electrode active material obtained in each of Experiments 1 to 6, carbon black functioning as a conductive agent, and a N-methyl-2-pyrollidone solution in which a poly(vinylidene fluoride) functioning as a binder agent was dissolved were kneaded together so that the mass ratio of the positive electrode active material, the conductive agent, and the binder agent was 92:5:3, thereby forming a positive electrode mixture slurry. After this slurry was applied on a positive electrode collector formed of aluminum foil and was then dried, rolling was performed by rolling rollers, and an aluminum collector tab was fitted to the rolled collector thus formed, thereby forming a positive electrode.

Figure 2:
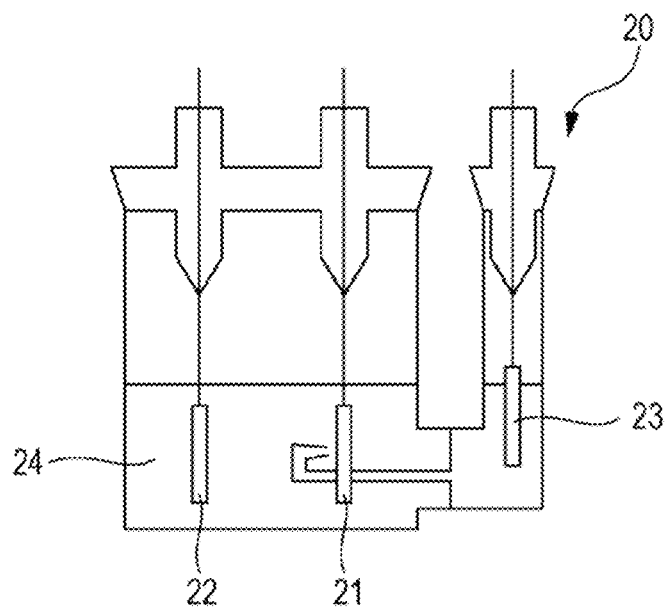
FIG. 2 is a schematic view of a three-electrode test cell using a positive electrode formed in an example or the like as a working electrode.

Next, as shown in FIG. 2, the above positive electrode was used as a working electrode 21. In addition, for each of a counter electrode 22 functioning as a negative electrode and a reference electrode 23, metal lithium was used. As a nonaqueous electrolyte 24, there was used a solution which was prepared by dissolving $LiPF_6$ in a mixed solvent containing ethylene carbonate, methyl ethyl carbonate, and dimethyl carbonate at a volume ratio of 3:3:4 to have a concentration of 1 mol/l and further by dissolving vinylene carbonate in the above mixture to have a concentration of 1 percent by mass. By the use of those constituents described above, a three-electrode test cell 20 as shown in FIG. 2 was formed.

Next, by the three-electrode test cell 20 using the positive electrode active material obtained in each of Experiments 1 to 6, under a temperature condition of 25° C., constant current charging was performed at a current density of 0.2 $mA/cm^2$ until the voltage reached 4.3 V (vs. $Li/Li^+$), and constant voltage charging was then performed at a constant voltage of 4.3 V (vs. $Li/Li^+$) until the current density reached 0.04 $mA/cm^2$. Subsequently, constant current discharging was performed at a current density of 0.2 $mA/cm^2$ until the voltage reached 2.5 V (vs. $Li/Li^+$). The discharge capacity in this case was regarded as a rated capacity of each three-electrode test cell 20.

Figure 3:
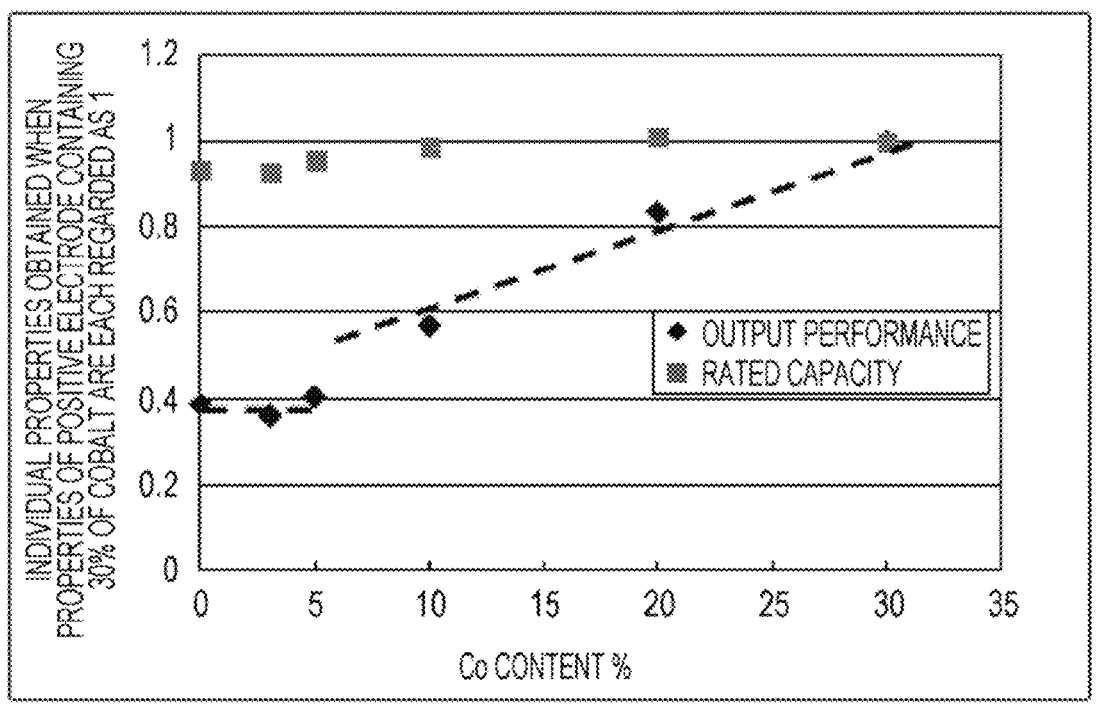
FIG. 3 is a graph showing capacity characteristics and output performances plotted with respect to the contents of cobalt in positive electrode active materials of Experiments 1 to 6.

Next, the point at which the three-electrode test cell 20 was charged to 50% of the rated capacity as described above was represented by SOC50, and the output performance of the three-electrode test cell 20 was measured at the SOC50 under a condition of 25° C. FIG. 3 is a graph in which the capacity characteristics and the output performance are plotted with respect to the content of cobalt in the positive electrode active material.

From FIG. 3, it is found that in Experiments 1 to 6, when the content of cobalt in the positive electrode active material is decreased, the output performance is degraded although the capacity characteristics are not so much changed, and that in a region in which the content of cobalt is 0 to 5 percent by mass, the output performance is particularly degraded.

On the other hand, the positive electrode active material according to this embodiment includes the first positive electrode active material in which the content of cobalt is 15 percent by mass or more and the second positive electrode active material in which the content of cobalt is 5 percent by mass or less. Furthermore, the average secondary particle diameter r1 of the first positive electrode active material is smaller than the average secondary particle diameter r2 of the second positive electrode active material. Hence, the positive electrode active material according to this embodiment is able to impart a high output performance to the nonaqueous electrolyte secondary battery 1. That is, since the two types of positive electrode active materials, which are the first positive electrode active material having a small average secondary particle diameter and a high cobalt content and the second positive electrode active material having a large average secondary particle diameter and a low cobalt content, are mixed together for the use, a high output performance can be imparted to the nonaqueous electrolyte secondary battery 1.

In the positive electrode active material according to this embodiment, lithium ions are preferentially inserted into the first positive electrode active material which contains a relatively large amount of cobalt and which is able to impart an excellent output performance. Accordingly, the potential of the first positive electrode active material is decreased. In this case, the potential difference is generated between the first positive electrode active material and the second positive electrode active material, and lithium ions are diffused to the surface of the positive electrode active material and the like. As a result, lithium ions are supplied to the surface of the second positive electrode active material. Hence, it is believed that since a reaction in the entire positive electrode active material including the first and the second positive electrode active materials rapidly progresses, the output performance is improved.

The positive electrode active material according to this embodiment may be preferably used as a positive electrode active material for a nonaqueous electrolyte secondary battery, such as a nonaqueous electrolyte secondary battery of a hybrid type electric car, which is required to have a high output performance.

Hereinafter, the present invention will be described in more detail with reference to particular examples. However, the present invention is not limited to the following examples and may be appropriately changed and modified without departing from the scope of the present invention.

Example 1

$Li_2CO_3$ was mixed at a predetermined ratio with $Ni_{0.35}Co_{0.35}Mn_{0.3}(OH)_2$ obtained by a co-precipitation method and was then fired at 900° C. in the air, so that a first positive electrode active material formed of $Li_{1.09}Ni_{0.32}CO_{0.32}Mn_{0.27}O_2$ having a layered structure was obtained. The average secondary particle diameter r1 of the first positive electrode active material was approximately 3.7 μm.

Next, $Li_2CO_3$ was mixed at a predetermined ratio with $Ni_{0.6}Mn_{0.4}(OH)_2$ obtained by a co-precipitation method and was then fired at 1,000° C. in the air, so that a second positive electrode active material formed of $Li_{1.07}Ni_{0.56}Mn_{0.37}O_2$ having a layered structure was obtained. The average secondary particle diameter r2 of the second positive electrode active material was approximately 8.0 μm.

The first positive electrode active material and the second positive electrode active material were mixed together at a mixing ratio (mass percent) of 58:42 to form a positive electrode active material.

Next, except that the positive electrode active material obtained in Example 1 was used, a three-electrode test cell 20 was formed in a manner similar to that in the above Experiments 1 to 6.

Example 2

Except that the mixing ratio of the first positive electrode active material and the second positive electrode active material was set to 28:72 on a mass percent basis, a positive electrode active material was formed in a manner similar to that in Example 1. Next, by the use of the positive electrode active material obtained in Example 2, a three-electrode test cell 20 was formed in a manner similar to that in Example 1.

Reference Example 1

Except that the first positive electrode active material was only used as the positive electrode active material, a positive electrode active material was formed in a manner similar to that in Example 1. Next, by the use of the positive electrode active material obtained in Reference Example 1, a three-electrode test cell 20 was formed in a manner similar to that in Example 1.

Comparative Example 1

Except that the second positive electrode active material was only used as the positive electrode active material, a positive electrode active material was formed in a manner similar to that in Example 1. Next, by the use of the positive electrode active material obtained in Comparative Example 1, a three-electrode test cell 20 was formed in a manner similar to that in Example 1.

Example 3

$Li_2CO_3$ was mixed at a predetermined ratio with $Ni_{0.50}Co_{0.20}Mn_{0.30}(OH)_2$ obtained by a co-precipitation method and was then fired at 900° C. in the air, so that a first positive electrode active material formed of $Li_{1.07}Ni_{0.46}Co_{0.18}Mn_{0.28}O_2$ having a layered structure was obtained. The average secondary particle diameter r1 of the first positive electrode active material was approximately 5.6 μm.

Except that the first positive electrode active material formed in Example 3 and the second positive electrode active material formed in Example 1 were mixed together at a mixing ratio of 50:50 on a mass percent basis as the positive electrode active material, a positive electrode active material was formed in a manner similar to that in Example 1. Next, by the use of the positive electrode active material obtained in Example 3, a three-electrode test cell 20 was formed in a manner similar to that in Example 1.

Reference Example 2

Except that the first positive electrode active material obtained in Example 3 was only used as the positive electrode active material, a positive electrode active material was formed in a manner similar to that in Example 1. Next, by the use of the positive electrode active material obtained in Reference Example 2, a three-electrode test cell 20 was formed in a manner similar to that in Example 1.

Example 4

$Li_2CO_3$ was mixed at a predetermined ratio with $Ni_{0.46}Co_{0.28}Mn_{0.26}(OH)_2$ obtained by a co-precipitation method and was then fired at 900° C. in the air, so that a first positive electrode active material formed of $Li_{1.08}Ni_{0.43}Co_{0.26}Mn_{0.24}O_2$ having a layered structure was obtained. The average secondary particle diameter r1 of the first positive electrode active material was approximately 5.7 μm.

Except that the first positive electrode active material formed in Example 4 and the second positive electrode active material formed in Example 1 were mixed together at a mixing ratio of 10:90 on a mass percent basis as the positive electrode active material, a positive electrode active material was formed in a manner similar to that in Example 1. Next, by the use of the positive electrode active material obtained in Example 4, a three-electrode test cell 20 was formed in a manner similar to that in Example 1.

Example 5

Except that the first positive electrode active material formed in Example 4 and the second positive electrode active material formed in Example 1 were mixed together at a mixing ratio of 40:60 on a mass percent basis as the positive electrode active material, a positive electrode active material was formed in a manner similar to that in Example 1. Next, by the use of the positive electrode active material obtained in Example 5, a three-electrode test cell 20 was formed in a manner similar to that in Example 1.

Reference Example 3

Except that the first positive electrode active material obtained in Example 4 was only used as the positive electrode active material, a positive electrode active material was formed in a manner similar to that in Example 1. Next, by the use of the positive electrode active material obtained in Reference Example 3, a three-electrode test cell 20 was formed in a manner similar to that in Example 1.

Reference Example 4

$Li_2CO_3$ was mixed at a predetermined ratio with $Ni_{0.35}Co_{0.35}Mn_{0.3}(OH)_2$ obtained by a co-precipitation method and was then fired at 900° C. in the air, so that a first positive electrode active material formed of $Li_{1.09}Ni_{0.32}Co_{0.32}Mn_{0.27}O_2$ having a layered structure was obtained. The average secondary particle diameter r1 of the first positive electrode active material was approximately 7.8 μm.

Except that the first positive electrode active material formed in Reference Example 4 was only used as the positive electrode active material, a positive electrode active material was formed in a manner similar to that in Example 1. Next, by the use of the positive electrode active material obtained in Reference Example 4, a three-electrode test cell 20 was formed in a manner similar to that in Example 1.

Comparative Example 2

$Li_2CO_3$ was mixed at a predetermined ratio with $Ni_{0.6}Mn_{0.4}(OH)_2$ obtained by a co-precipitation method and was then fired at 1,000° C. in the air, so that a second positive electrode active material formed of $Li_{1.06}Ni_{0.56}Mn_{0.38}O_2$ having a layered structure was obtained. The average secondary particle diameter r2 of the second positive electrode active material was approximately 4.5 μm.

Except that the first positive electrode active material formed in Reference Example 4 and the second positive electrode active material formed in Comparative Example 2 were mixed together at a mixing ratio of 58:42 on a mass percent basis as the positive electrode active material, a positive electrode active material was formed in a manner similar to that in Example 1. Next, by the use of the positive electrode active material obtained in Comparative Example 2, a three-electrode test cell 20 was formed in a manner similar to that in Example 1.

Comparative Example 3

Except that the mixing ratio between the first positive electrode active material and the second positive electrode active material was set to 28:72 on a mass percent basis, a positive electrode active material was formed in a manner similar to that in Comparative Example 2. Next, by the use of the positive electrode active material obtained in Comparative Example 3, a three-electrode test cell 20 was formed in a manner similar to that in Example 1.

Comparative Example 4

Except that the second positive electrode active material obtained in Comparative Example 2 was only used as the positive electrode active material, a positive electrode active material was formed in a manner similar to that in Example 1. Next, by the use of the positive electrode active material obtained in Comparative Example 4, a three-electrode test cell 20 was formed in a manner similar to that in Example 1.

Comparative Example 5

$Li_2CO_3$ was mixed at a predetermined ratio with $Ni_{0.6}Co_{0.20}Mn_{0.2}(OH)_2$ obtained by a co-precipitation method and was then fired at 850° C. in the air, so that a second positive electrode active material formed of $Li_{1.07}Ni_{0.56}Co_{0.19}Mn_{0.18}O_2$ having a layered structure was obtained. The average secondary particle diameter r2 of the second positive electrode active material was approximately 5.7 μm.

Except that the first positive electrode active material obtained in Example 1 and the second positive electrode active material obtained in Comparative Example 5 were mixed together at a mixing ratio of 58:42 on a mass percent basis as the positive electrode active material, a positive electrode active material was formed in a manner similar to that in Example 1. Next, by the use of the positive electrode active material obtained in Comparative Example 5, a three-electrode test cell 20 was formed in a manner similar to that in Example 1.

Comparative Example 6

Except that the first positive electrode active material and the second positive electrode active material were mixed together at a mixing ratio of 28:72 on a mass percent basis, a positive electrode active material was formed in a manner similar to that in Comparative Example 5. Next, by the use of the positive electrode active material obtained in Comparative Example 6, a three-electrode test cell 20 was formed in a manner similar to that in Example 1.

Comparative Example 7

Except that the second positive electrode active material obtained in Comparative Example 5 was only used as the positive electrode active material, a positive electrode active material was formed in a manner similar to that in Example 1. Next, by the use of the positive electrode active material thus obtained, a three-electrode test cell 20 was formed in a manner similar to that in Example 1.

(Comparison of Output Performance)

The rated capacity and the output performance of each of the three-electrode test cells 20 obtained in the Examples, Comparative Examples, and Reference Examples were obtained as in the case of the above Experiments 1 to 6. Next, by using the measured value of the output performance of each of the three-electrode test cells 20 of Reference Examples 1 to 4 and Comparative Examples 1, 4, and 7 in which the positive electrode active material formed without mixing the first positive electrode active material and the second positive electrode active material was used, a weighted average calculated output performance at a temperature of 25° C. based on the mixing ratio between the first and the second positive electrode active materials was obtained by the following formula.

Calculated Output Performance=(Output Performance Only by First Positive Electrode Active Material)×(Mixing Ratio of First Positive Electrode Active Material)+(Output Performance Only by Second Positive Electrode Active Material)×(Mixing Ratio of Second Positive Electrode Active Material)

Based on the calculated output performance thus obtained, from a measured output performance of each of the three-electrode test cells 20 of Examples 1 to 5 and Comparative Examples 2, 3, 5, and 6 in which the positive electrode active material obtained by mixing the first positive electrode active material and the second positive electrode active material was used, the ratio of the measured output performance to the calculated output performance was calculated by the following formula.

(Ratio of Measured Output Performance to Calculated Output Performance)=(Measured Output Performance)/(Calculated Output Performance)

The results of the comparison in output performance obtained from the composition of the first and the composition of the second positive electrode active materials are shown in Tables 1 to 5.

TABLE 1

| | First Positive Electrode Active Material | Second Positive Electrode Active Material | Average Secondary Particle Diameter of First Positive Electrode Active Material | Average Secondary Particle Diameter of Second Positive Electrode Active Material | Mixing Ratio between First and Second Positive Electrode Active Materials (Mass Percent) | Ratio of Output Performance to Second Positive Electrode Active Material | Ratio of Measured Output Performance to Calculated Output Performance |
|---|---|---|---|---|---|---|---|
| Example 1 | $Li_{1.09}Ni_{0.32}Co_{0.32}Mn_{0.27}O_2$ | $Li_{1.07}Ni_{0.56}Mn_{0.37}O_2$ | 3.7 μm | 8.0 μm | 58:42 | 2.60 | 1.32 |
| Example 2 | $Li_{1.09}Ni_{0.32}Co_{0.32}Mn_{0.27}O_2$ | $Li_{1.07}Ni_{0.56}Mn_{0.37}O_2$ | 3.7 μm | 8.0 μm | 28:72 | 2.95 | 1.63 |
| Comparative Example 1 | — | $Li_{1.07}Ni_{0.56}Mn_{0.37}O_2$ | — | 8.0 μm | 0:100 | 1.00 | — |

TABLE 2

| | First Positive Electrode Active Material | Second Positive Electrode Active Material | Average Secondary Particle Diameter of First Positive Electrode Active Material | Average Secondary Particle Diameter of Second Positive Electrode Active Material | Mixing Ratio between First and Second Positive Electrode Active Materials (Mass Percent) | Ratio of Output Performance to Second Positive Electrode Active Material | Ratio of Measured Output Performance to Calculated Output Performance |
|---|---|---|---|---|---|---|---|
| Comparative Example 2 | $Li_{1.09}Ni_{0.32}Co_{0.32}Mn_{0.27}O_2$ | $Li_{1.06}Ni_{0.56}Mn_{0.38}O_2$ | 7.8 μm | 4.5 μm | 58:42 | 1.20 | 1.09 |
| Comparative Example 3 | $Li_{1.09}Ni_{0.32}Co_{0.32}Mn_{0.27}O_2$ | $Li_{1.06}Ni_{0.56}Mn_{0.38}O_2$ | 7.8 μm | 4.5 μm | 28:72 | 1.19 | 0.99 |
| Comparative Example 4 | — | $Li_{1.06}Ni_{0.56}Mn_{0.38}O_2$ | — | 4.5 μm | 0:100 | 1.00 | — |

TABLE 3

| | First Positive Electrode Active Material | Second Positive Electrode Active Material | Average Secondary Particle Diameter of First Positive Electrode Active Material | Average Secondary Particle Diameter of Second Positive Electrode Active Material | Mixing Ratio between First and Second Positive Electrode Active Materials (Mass Percent) | Ratio of Output Performance to Second Positive Electrode Active Material | Ratio of Measured Output Performance to Calculated Output Performance |
|---|---|---|---|---|---|---|---|
| Comparative Example 5 | $Li_{1.09}Ni_{0.32}Co_{0.32}Mn_{0.27}O_2$ | $Li_{1.07}Ni_{0.56}Co_{0.19}Mn_{0.18}O_2$ | 3.7 μm | 5.7 μm | 58:42 | 0.96 | 0.94 |
| Comparative Example 6 | $Li_{1.09}Ni_{0.32}Co_{0.32}Mn_{0.27}O_2$ | $Li_{1.07}Ni_{0.56}Co_{0.19}Mn_{0.18}O_2$ | 3.7 μm | 5.7 μm | 28:72 | 0.95 | 0.93 |
| Comparative Example 7 | — | $Li_{1.07}Ni_{0.56}Co_{0.19}Mn_{0.18}O_2$ | — | 5.7 μm | 0:100 | 1.00 | — |

TABLE 4

| | First Positive Electrode Active Material | Second Positive Electrode Active Material | Average Secondary Particle Diameter of First Positive Electrode Active Material | Average Secondary Particle Diameter of Second Positive Electrode Active Material | Mixing Ratio between First and Second Positive Electrode Active Materials (Mass Percent) | Ratio of Output Performance to Second Positive Electrode Active Material | Ratio of Measured Output Performance to Calculated Output Performance |
|---|---|---|---|---|---|---|---|
| Example 3 | $Li_{1.07}Ni_{0.46}Co_{0.18}Mn_{0.28}O_2$ | $Li_{1.07}Ni_{0.56}Mn_{0.37}O_2$ | 5.6 μm | 8.0 μm | 50:50 | 2.86 | 1.33 |
| Comparative Example 1 | — | $Li_{1.07}Ni_{0.56}Mn_{0.37}O_2$ | — | 8.0 μm | 0:100 | 1.00 | — |

TABLE 5

| | First Positive Electrode Active Material | Second Positive Electrode Active Material | Average Secondary Particle Diameter of First Positive Electrode Active Material | Average Secondary Particle Diameter of Second Positive Electrode Active Material | Mixing Ratio between First and Second Positive Electrode Active Materials (Mass Percent) | Ratio of Output Performance to Second Positive Electrode Active Material | Ratio of Measured Output Performance to Calculated Output Performance |
|---|---|---|---|---|---|---|---|
| Example 4 | $Li_{1.08}Ni_{0.43}Co_{0.26}Mn_{0.24}O_2$ | $Li_{1.07}Ni_{0.56}Mn_{0.37}O_2$ | 5.7 μm | 8.0 μm | 10:90 | 1.89 | 1.51 |
| Example 5 | $Li_{1.08}Ni_{0.43}Co_{0.26}Mn_{0.24}O_2$ | $Li_{1.07}Ni_{0.56}Mn_{0.37}O_2$ | 5.7 μm | 8.0 μm | 40:60 | 3.65 | 1.60 |
| Comparative Example 1 | — | $Li_{1.07}Ni_{0.56}Mn_{0.37}O_2$ | — | 8.0 μm | 0:100 | 1.00 | — |

As apparent from the results shown in Tables 1, 4, and 5, as for the output performances of the three-electrode test cells 20 of Examples 1 to 5, the ratios of the measured output performance to the calculated output performance are 1.32, 1.63, 1.33, 1.51, and 1.60, respectively, and hence it is found that the output is significantly improved. In addition, the ratios of the output performances with respect to that of Comparative Example 1 in which the second positive electrode active material was only used are 2.60, 2.95, 2.86, 1.89, and 3.65, and hence, the outputs are each significantly improved.

Although the reason the output performance of the three-electrode test cell 20 of each of Examples 1 to 5 is significantly improved has not been clearly understood, the following may be considered. That is, since lithium ions are preferentially inserted into the first positive electrode active material which contains a large amount of cobalt and which is excellent in output performance, the potential of the first positive electrode active material is decreased. In this case, since the potential difference is generated between the first and the second positive electrode active materials, lithium ions are diffused and are supplied to the surface of the second positive electrode active material. In addition, the reaction in the positive electrode active material rapidly progresses, and hence, the output performance is improved. It is believed that since the average secondary particle diameter r1 of the first positive electrode active material is smaller than the average secondary particle diameter r2 of the second positive electrode active material, and the first positive electrode active material covers the second positive electrode active material, the diffusion of lithium ions is generated.

For example, as shown in Table 2, in Comparative Examples 2 and 3, the output performance of the three-electrode test cell 20 which uses the positive electrode active material obtained by mixing the first and the second positive electrode active materials shows an equivalent value to that of the calculated output performance. The reason for this is believed that since the average secondary particle diameter of the first positive electrode active material is larger than that of the second positive electrode active material, the first positive electrode active material cannot cover the surface of the second positive electrode active material, and hence, the diffusion of lithium ions to the second positive electrode active material is not generated.

Figure 4:
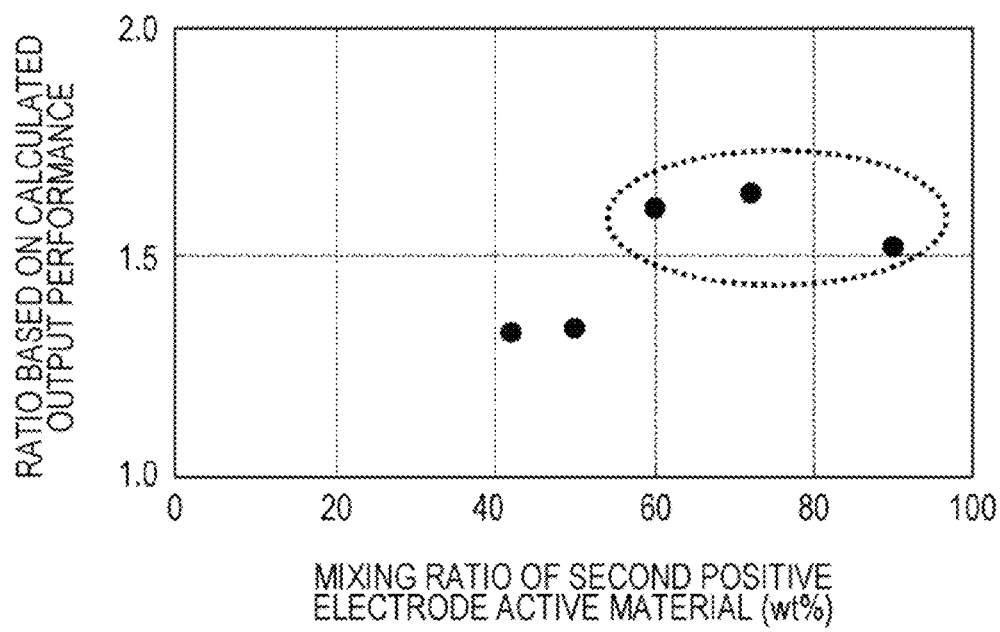
FIG. 4 is a view showing the relationship between a mixing ratio of a second positive electrode active material and a ratio based on a calculated output performance.

In addition, in Example 2, although a large amount of the second positive electrode active material is present which exhibits an inferior output performance by itself, the output performance is superior to that of Example 1, and the ratio of the measured output performance to the calculated output performance is also high. In Examples 4 and 5, although 90 percent by mass and 60 percent by mass of the second positive electrode active materials are present, respectively, the ratio of the measured output performance to the calculated output performance is higher than that of Example 1. From the results described above, it is found that when 60 to 90 percent by mass of the second positive electrode active material is present as shown in FIG. 4, the output performance is specifically superior. The reason for this has not been clearly understood, for example, the following may be considered. That is, since a large amount of the second positive electrode active material is present, a larger amount of lithium ions is supplied to the second positive electrode active material, and the reaction in the positive electrode active material rapidly progresses, so that the output performance is improved.

In addition, as shown in Table 3, in Comparative Examples 5 and 6, the output performance of the three-electrode test cell 20 which uses the positive electrode active material obtained by mixing the first and the second positive electrode active materials is inferior to the calculated output performance. The reason for this is believed that since the second positive electrode active material contains more than 5% of cobalt on an atomic percent basis in the transition metals and has an excellent output performance, preferential insertion of lithium ions into the first positive electrode active material is not generated, and the potential difference between the active materials is not generated, so that no diffusion of lithium ions occurs.

Next, cylindrical batteries using positive electrode active materials according to Examples 6 and 7 and Comparative Examples 8 and 9 were formed, and the performances thereof were evaluated.

Example 6

The first positive electrode active material formed in Example 4 and the second positive electrode active material formed in Example 1 were mixed together at a mixing ratio of 36:64 on a mass percent basis as the positive electrode active material. The positive electrode active material described above, carbon black functioning as a conductive agent, and an N-methyl-2-pyrollidone solution in which a poly(vinylidene fluoride) functioning as a binder agent was dissolved were kneaded together so that the mass ratio of the positive electrode active material, the conductive agent, and the binder agent was 92:5:3, thereby forming a positive electrode mixture slurry.

After the above slurry was applied onto aluminum foil to be used as a collector and was then dried, the collector onto which the positive electrode mixture was applied was rolled by rolling rollers, and an aluminum collector tab was then fitted to the rolled collector thus formed, thereby forming a positive electrode.

Next, after a graphite powder was charged into a solution in which CMC (carboxy methyl cellulose) functioning as a thickening agent was dissolved in water and was then mixed together by stirring, an SBR functioning as a binder was further mixed to prepare a slurry. The mass ratio of the graphite, SBR, and CMC was set to 98:1:1. The slurry thus obtained was applied onto two surfaces of copper foil and was then vacuum-dried at 150° C. for 2 hours, so that a negative electrode was formed.

An ion-permeable polyethylene microporous film was used as a separator, and the positive electrode, the negative electrode, and the separator provided therebetween were spirally wound to form an electrode body.

After this electrode body was inserted into a battery can, as a nonaqueous electrolyte, $LiPF_6$ was dissolved in a mixed solvent in which ethylene carbonate, methyl ethyl carbonate, and dimethyl carbonate were mixed together at a volume ratio of 3:3:4 to have a concentration of 1 mol/l, and vinylene carbonate was further dissolved to have a concentration of 1 percent by mass. Subsequently, the above electrolyte in which LiBOB [lithium bisoxalate borate] was further dissolved to have a concentration of 0.1 mol/l was injected, and sealing was performed, so that a cylindrical type battery according to this example was formed.

Example 7

$Li_2CO_3$ was mixed at a predetermined ratio with $Ni_{0.46}Co_{0.28}Mn_{0.26}(OH)_2$ obtained by a co-precipitation method and was then fired at 880° C. in the air, so that a first positive electrode active material formed of $Li_{1.08}Ni_{0.43}Co_{0.26}Mn_{0.24}O_2$ having a layered structure was obtained. The average secondary particle diameter r1 of the first positive electrode active material was approximately 5.7 μm.

Next, $Li_2CO_3$ was mixed at a predetermined ratio with $Ni_{0.6}Mn_{0.4}(OH)_2$ obtained by a co-precipitation method and was then fired at 980° C. in the air, so that a second positive electrode active material formed of $Li_{1.07}Ni_{0.56}Mn_{0.37}O_2$ having a layered structure was obtained. The average secondary particle diameter r2 of the second positive electrode active material was approximately 8.0 μm.

The first positive electrode active material and the second positive electrode active material were mixed together at a mixing ratio of 36:64 (mass percent) to form a positive electrode active material. Next, by the use of the positive electrode active material obtained in Example 7, a cylindrical type battery was formed in a manner similar to that in Example 6.

Comparative Example 8

Next, by the use of the positive electrode active material (that is, only the second positive electrode active material) obtained in Comparative Example 1, a cylindrical type battery was formed in a manner similar to that in Example 6.

Comparative Example 9

Except that the second positive electrode active material used in Example 7 was only used as the positive electrode active material, a cylindrical type battery was formed in a manner similar to that in Comparative Example 8.

Reference Example 5

Except that the first positive electrode active material obtained in Example 6 was only used as the positive electrode active material, a positive electrode active material was formed in a manner similar to that in Example 6. Next, by the use of the positive electrode active material obtained in Reference Example 5, a cylindrical type battery was formed in a manner similar to that in Example 6.

Reference Example 6

Except that the first positive electrode active material obtained in Example 7 was only used as the positive electrode active material, a positive electrode active material was formed in a manner similar to that in Example 7. Next, by the use of the positive electrode active material obtained in Reference Example 6, a cylindrical type battery was formed in a manner similar to that in Example 7.

(Comparison of Output Performance)

After the cylindrical type battery was formed as described above, constant current charging was performed at a current of 1,200 mA under a condition of 25° C. until the voltage reached 4.2 V, and constant voltage charging was then performed at 4.2 V. Subsequently, constant current discharging was performed at 1,200 mA until the voltage reached 2.5 V. The discharge capacity in this case was regarded as a rated capacity of the cylindrical type battery.

Next, after the cylindrical type battery of each of Examples 6 and 7, Comparative Examples 8 and 9, and Reference Examples 5 and 6 formed as described above was charged to 50% of the rated capacity, from the maximum current at which the discharge can be maintained for 10 seconds when the discharge end voltage was set to 2.5 V at a battery temperature of −30° C., an output value at a state of charge (SOC) of 50% was obtained by the following formula.

Output Value (SOC 50%)=(Maximum Current)×Discharge End Voltage (2.5 V)

Next, by the use of the measured output performance of each of the cylindrical type batteries of Reference Example 5 and Comparative Example 8 in which the positive electrode active material formed without mixing the first positive electrode active material and the second positive electrode active material was used, a weighted average calculated output performance at −30° C. based on the mixing ratio between the first and the second positive electrode active materials was obtained by the following formula.

Calculated Output Performance=(Output Performance Only by First Positive Electrode Active Material)×(Mixing Ratio of First Positive Electrode Active Material)+(Output Performance Only by Second Positive Electrode Active Material)×(Mixing Ratio of Second Positive Electrode Active Material)

Based on the calculated output performance thus obtained, by the following formula, the ratio of the measured output performance to the calculated output performance was calculated from the measured value of the output performance of each of the cylindrical type batteries of Examples 6 and 7 in which the positive electrode active material obtained by mixing the first positive electrode active material and the second positive electrode active material was used.

(Ratio of Measured Output Performance to Calculated Output Performance)=(Measured Output Measurement Performance)/(Calculated Output Performance)

(Calculation of Half Width)

Next, a half width FWHM110 of the peak of the first positive electrode active material and that of the second positive electrode active material used in Examples 6 and 7 present in a range of $2\theta=64.5°\pm1.0°$ were calculated as follows.

Figure 5:
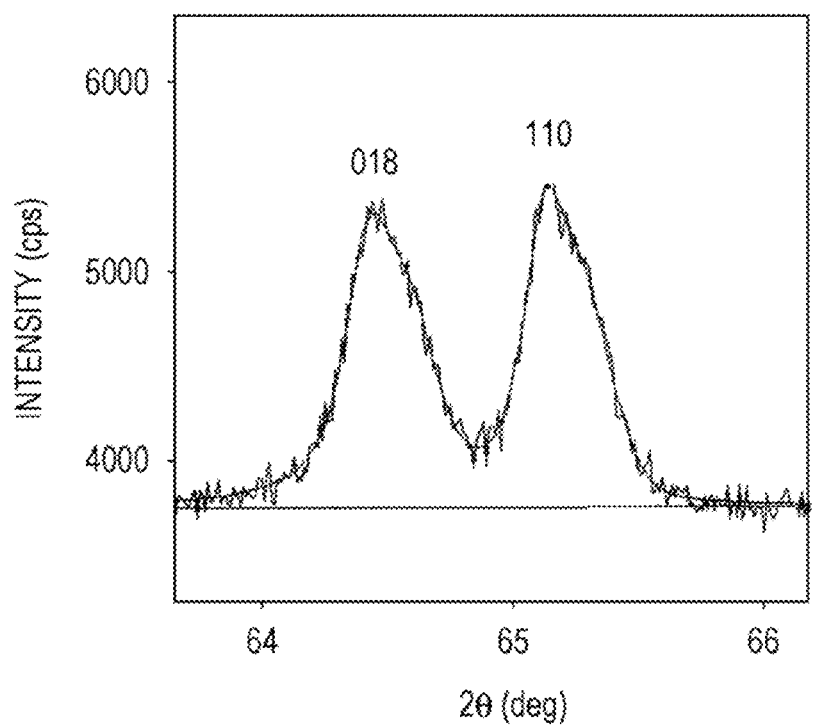
FIG. 5 is a view showing XRD patterns before and after fitting of diffraction peaks of 018 and 110.

After an XRD pattern of the above lithium transition metal oxide was obtained by using a powder x-ray diffraction apparatus (manufactured by Rigaku Corporation) in which CuKα was used as an x-ray source, by the use of a split pseudo-voigt function, ten peaks of 003, 101, 006, 012, 104, 015, 107, 018, 110, and 113 were obtained from the XRD pattern of the lithium transition metal oxide, and by the use of those peaks, the peak fitting was performed by the split pseudo-voigt function, so that the FWHM110 (including apparatus dependence) was obtained with high accuracy. FIG. 5 shows XRD patterns obtained before and after the fitting of the peaks of 018 and 110.

Furthermore, in order to calculate a half width depending on the apparatus, by using NISTSRM660bLaB6 having a high crystallinity and its own extremely small half width, ten peaks of 100, 110, 111, 200, 210, 211, 220, 221, 310, and 311 were obtained, and by the use thereof, fitting was performed by a split pseudo-voigt function. By using the obtained half width of each lattice plane, approximation was performed by a quadratic curve, and an approximation formula of the half width with respect to the angles was calculated.

In addition, since the value of each angle of the approximation formula is a half width depending on the apparatus, by subtraction of the half width depending on the apparatus from the FWHM110 (including the apparatus dependence), FWHM110 of the first positive electrode active material and that of the second positive electrode active material of Examples 6 and 7, each of which excluded the half width depending on the apparatus, were calculated.

The results of the output performances of the cylindrical type batteries of Examples 6 and 7 and the FWHM110 of the first positive electrode active material and that of the second positive electrode active material are shown in Table 6.

TABLE 6

| | First Positive Electrode Active Material | | Second Positive Electrode Active Material | | Average Secondary Particle Diameter of First Positive Electrode Active Material | Average Secondary Particle Diameter of Second Positive Electrode Active Material | Mixing Ratio between First and Second Positive Electrode Active Materials (Mass Percent) | Ratio of Output Performance to Second Positive Electrode Active Material | Ratio of Measured Output Performance to Calculated Output Performance |
|---|---|---|---|---|---|---|---|---|---|
| | Composition | FWHM110 (°) | Composition | FWHM110 (°) | | | | | |
| Example 6 | $Li_{1.08}Ni_{0.43}Co_{0.26}Mn_{0.24}O_2$ | 0.17 | $Li_{1.07}Ni_{0.56}Mn_{0.37}O_2$ | 0.15 | 5.7 μm | 8.0 μm | 36:64 | 3.17 | 1.42 |
| Example 7 | $Li_{1.08}Ni_{0.43}Co_{0.26}Mn_{0.24}O_2$ | 0.23 | $Li_{1.07}Ni_{0.56}Mn_{0.37}O_2$ | 0.21 | 5.7 μm | 8.0 μm | 36:64 | 3.76 | 1.69 |
| Comparative Example 8 | — | | $Li_{1.07}Ni_{0.56}Mn_{0.37}O_2$ | 0.15 | — | 8.0 μm | 0:100 | 1.00 | — |
| Comparative Example 9 | — | | $Li_{1.07}Ni_{0.56}Mn_{0.37}O_2$ | 0.21 | — | 8.0 μm | 0:100 | 1.00 | — |

As apparent from the results shown in Table 6, it is found that the output performances of the cylindrical type batteries of Examples 6 and 7 are significantly improved since the ratios of the measured output performance to the calculated output performance are 1.42 and 1.69, respectively. In addition, the ratios of the output performances with respect to that of Comparative Example 8 in which the second positive electrode active material was only used are 3.17 and 3.76, and hence, the outputs are significantly improved.

Although the reason the output performance of the cylindrical type battery of each of Examples 6 and 7 is significantly improved has not been clearly understood, this case may also be considered similar to the case of the three-electrode test cell of each of Examples 1 to 5. That is, since lithium ions are preferentially inserted into the first positive electrode active material containing a large amount of cobalt and having an excellent output performance, the potential of the first positive electrode active material is decreased. In this case, since the potential difference is generated between the first and the second positive electrode active materials, lithium ions are diffused and are supplied to the surface of the second positive electrode active material. In addition, the reaction in the positive electrode active material rapidly progresses, and hence, the output performance is improved. It is believed that since the average secondary particle diameter r1 of the first positive electrode active material is smaller than the average secondary particle diameter r2 of the second positive electrode active material, and the first positive electrode active material covers the second positive electrode active material, the diffusion of lithium ions is generated.

In addition, it is found that the output performance of Example 7 is significantly improved as compared to that of Example 6. Although the reason for this has not been clearly understood, the following may be considered. It is believed that since the FWHM110 of the positive electrode active material is increased, the crystallite size is decreased, and the diffusion length of Li ions is decreased, so that the output performance is improved. In this case, since it is believed that lithium ions are preferentially inserted into the first positive electrode active material having an excellent output performance, the FWHM110 of the first positive electrode active material is preferably large and is preferably set in a range of 0.1° to 0.3°. The reason for this is that when the FWHM110 is less than 0.1°, since the crystallite size is grown, and the diffusion length of Li ions is increased, the output performance is degraded, and when the FWHM110 is more than 0.3°, since the growth of crystals becomes insufficient, and insertion and desorption of lithium may become difficult, the positive electrode capacity and the output are degraded. In addition, since the output performance of Example 7 is improved as compared to that of Example 6, the range of the FWHM110 of the first positive electrode active material is more preferably set in a range of 0.2° to 0.3°.

In addition, since lithium ions are preferentially inserted into the first positive electrode active material, the potential difference is generated between the first and the second positive electrode active materials, and lithium ions are diffused and are supplied to the surface of the second positive electrode active material; hence, in the second positive electrode active material, the diffusion length of lithium ions is preferably small, and the FWHM110 is also preferably set in a range of 0.1° to 0.3° as is the first positive electrode active material. When the FWHM110 is in the range as described above, even if a positive electrode active material containing a small amount of cobalt is used, the output performance can be improved. In addition, since the output performance of Example 7 is improved as compared to that of Example 6, the FWHM110 of the second positive electrode active material is more preferably set in a range of 0.2° to 0.3°.

REFERENCE SIGNS LIST 1 nonaqueous electrolyte secondary battery
10 electrode body
11 negative electrode
12 positive electrode
13 separator
17 battery container
20 three-electrode test cell
21 working electrode
22 counter electrode
23 reference electrode
24 nonaqueous electrolyte

The invention claimed is:

1. A positive electrode active material of a nonaqueous electrolyte secondary battery, the positive electrode active material comprising:
a first positive electrode active material in which the content of cobalt is 15% or more on an atomic percent basis in transition metals; and
a second positive electrode active material in which the content of cobalt is less than 5% on an atomic percent basis in transition metals,
wherein an average secondary particle diameter r1 of the first positive electrode active material is smaller than an average secondary particle diameter r2 of the second positive electrode active material,
wherein the first positive electrode active material is a compound represented by general formula (1):

$$Li_{1+x1}Ni_{a1}Mn_{b1}Co_{c1}O_{2+d1} \qquad (1)$$

wherein in the general formula (1), x1, a1, b1, c1, and d1 satisfy x1+a1+b1+c1=1, 0<x1≤0.1, 0.15≤c1/(a1+b1+c1), 0.7≤a1/b1≤3.0, and −0.1≤d1≤0.1, and
the second positive electrode active material is a compound represented by general formula (2):

$$Li_{1+x2}Ni_{a2}Mn_{b2}O_{2+d2} \qquad (2)$$

wherein in the general formula (2), x2, a2, b2, and d2 satisfy
x2+a2+b2=1,
0<x2≤0.1,
0.7≤a2/b2≤3.0, and
−0.1≤d2≤0.1.

2. The positive electrode active material of a nonaqueous electrolyte secondary battery according to claim 1,
wherein the average secondary particle diameter r1 of the first positive electrode active material and the average secondary particle diameter r2 of the second positive electrode active material satisfy the relationship of r1/r2<0.8.

3. The positive electrode active material of a nonaqueous electrolyte secondary battery according to claim 2,
wherein the content of the second positive electrode active material is 10 to 90 percent by mass.

4. The positive electrode active material of a nonaqueous electrolyte secondary battery according to claim 3,
wherein in powder x-ray diffraction measurement using CuKα rays for the first positive electrode active material, when the half width of a 110 diffraction peak present in a range of a diffraction angle 2θ of 64.5°±1.0° is represented by FWHM110, 0.1°≤FWHM110≤0.3° is satisfied.

5. The positive electrode active material of a nonaqueous electrolyte secondary battery according to claim 2,
wherein in powder x-ray diffraction measurement using CuKα rays for the first positive electrode active material, when the half width of a 110 diffraction peak present in a range of a diffraction angle 2θ of 64.5°±1.0° is represented by FWHM110, 0.1°≤FWHM110≤0.3° is satisfied.

6. The positive electrode active material of a nonaqueous electrolyte secondary battery according to claim 1,
wherein the content of the second positive electrode active material is 10 to 90 percent by mass.

7. The positive electrode active material of a nonaqueous electrolyte secondary battery according to claim 1,
wherein the content of the second positive electrode active material is 40 to 90 percent by mass.

8. The positive electrode active material of a nonaqueous electrolyte secondary battery according to claim 1,
wherein the content of the second positive electrode active material is 60 to 90 percent by mass.

9. The positive electrode active material of a nonaqueous electrolyte secondary battery according to claim 1,
wherein in powder x-ray diffraction measurement using CuKα rays for the first positive electrode active material, when the half width of a 110 diffraction peak present in a range of a diffraction angle 2θ of 64.5°±1.0° is represented by FWHM110, 0.1°≤FWHM110≤0.3° is satisfied.

10. The positive electrode active material of a nonaqueous electrolyte secondary battery according to claim 9,
wherein in powder x-ray diffraction measurement using CuKα rays for the second positive electrode active material, when the half width of a 110 diffraction peak present in a range of a diffraction angle 2θ of 64.5°±1.0° is represented by FWHM110, 0.1°≤FWHM110≤0.3° is satisfied.

11. The positive electrode active material of a nonaqueous electrolyte secondary battery according to claim 1,
wherein in powder x-ray diffraction measurement using CuKα rays for the second positive electrode active material, when the half width of a 110 diffraction peak present in a range of a diffraction angle 2θ of 64.5°±1.0° is represented by FWHM110, 0.1°≤FWHM110≤0.3° is satisfied.

12. A nonaqueous electrolyte secondary battery comprising:
a positive electrode containing the positive electrode active material according to claim 1; a negative electrode; a nonaqueous electrolyte; and a separator.

* * * * *